Feb. 6, 1934.  E. STARBUCK  1,946,038
CLUTCH
Filed March 6, 1931  2 Sheets-Sheet 1
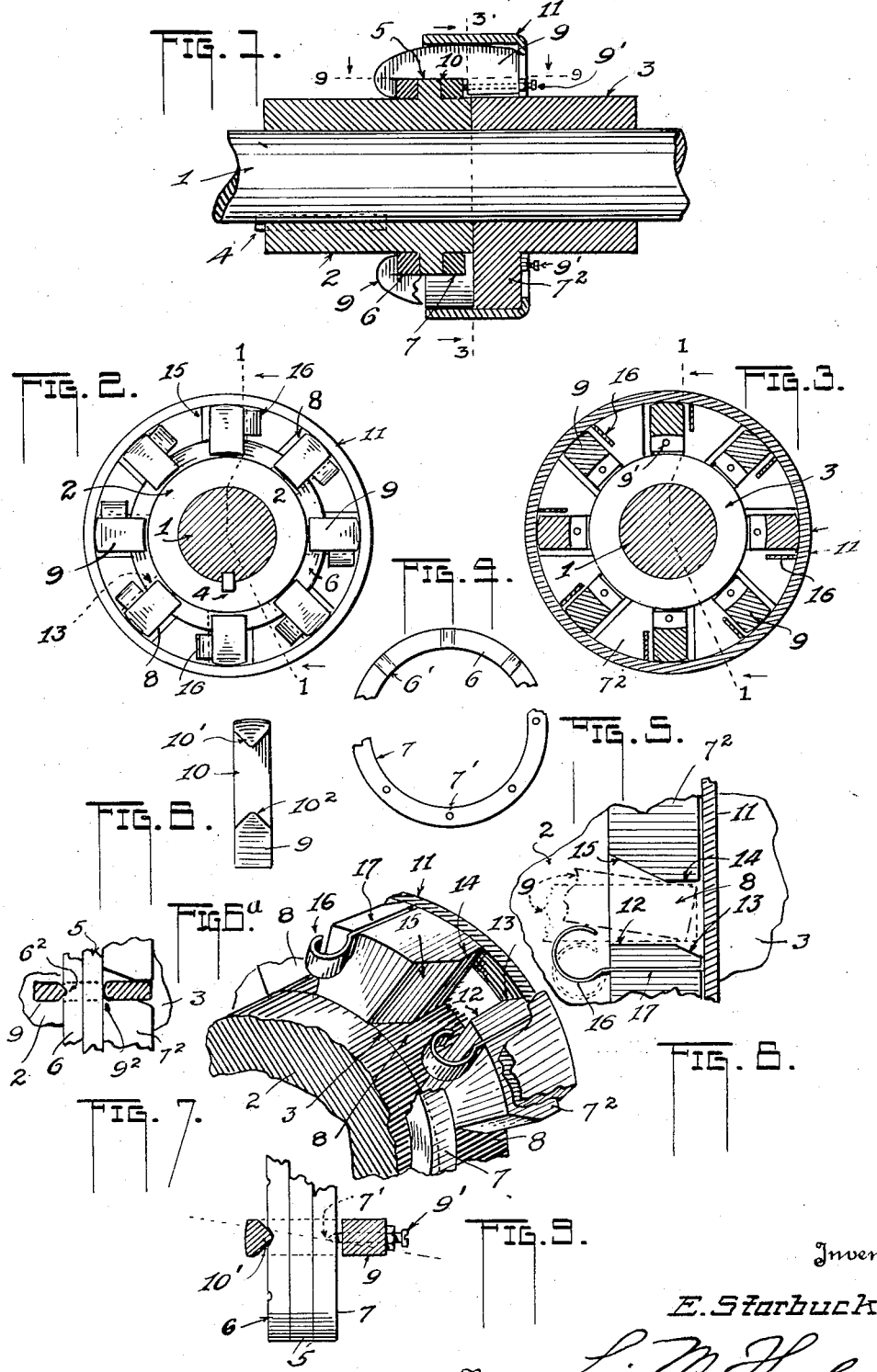

Feb. 6, 1934. E. STARBUCK 1,946,038
CLUTCH
Filed March 6, 1931 2 Sheets-Sheet 2
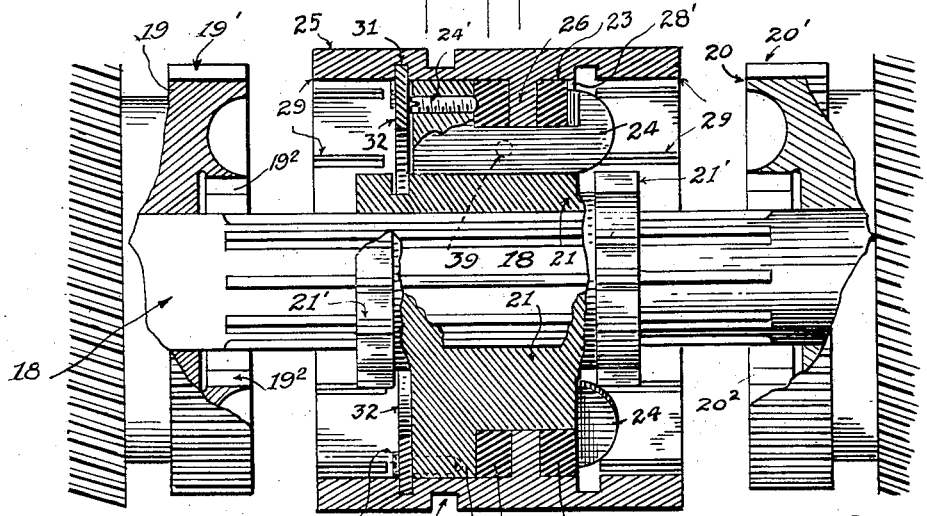
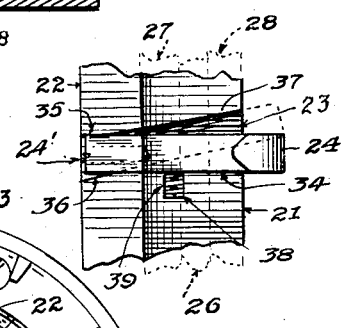
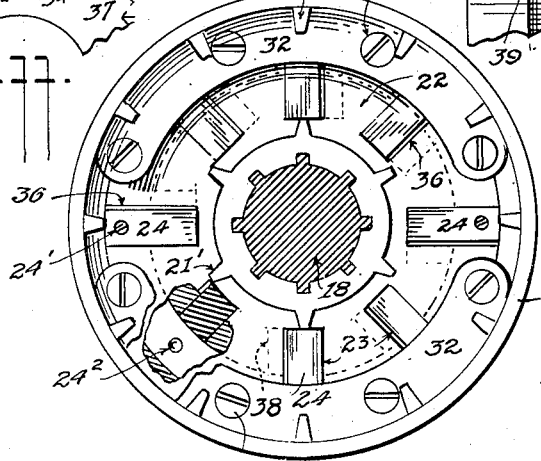
Inventor
E. Starbuck,
By L. M. Thurlow
Attorney Patented Feb. 6, 1934

1,946,038

UNITED STATES PATENT OFFICE 1,946,038

CLUTCH

Ernest Starbuck, Peoria, Ill.

Application March 6, 1931. Serial No. 520,487

22 Claims. (Cl. 192—48)

This invention has to do with clutches, being directed more particularly to what is often referred to as an "over running" clutch, or one wherein a driven part may run ahead of the driving part under certain conditions.

The clutch of my invention is designed for general use while adapted for the gearing of an automobile involving so called "free wheeling".

The main object lies in providing a simple form of clutch wherein certain dogs in the operation of the clutch clamp together friction members in producing a positive drive.

Another object is that of providing a friction surface on one member of a clutch, a floating member to engage therewith, and to mount a dog on the other member of the clutch so appointed that in the rotation of the clutch in one direction said dog will automatically clamp the parts into non-slipping engagement.

A further object is to furnish a clutch part of which is peculiarly formed to the end that a dog mounted thereon will be positively moved to a cramping position to effect the clamping of clutching portions upon each other in one direction of rotation while permitting the dog to take up a neutral position when one of the clutch parts runs ahead of the other.

The appended drawings are provided in order that my invention may be thoroughly understood, minor changes in the structure and arrangement being possible without departing from the inventive idea and as lying within the meaning of the appended claims.

Figure 1 is a longitudinal section of one form of the clutch of my invention. Figure 2 is an end elevation of the same as it appears in viewing Figure 1 from the left. Figure 3 is a transverse section of the clutch on line 3—3 of Figure 1. Figures 4 and 5 are plans of portions of two friction rings. Figure 6 shows a dog as seen edgewise. Figure 6a is a detail in plan and in part section of a slight modification of the clutch shown in Figure 1. Figure 7 illustrates in perspective part of one of the clutch members and certain other parts used in connection therewith. Figure 8 is a side elevation of the structure appearing in Figure 7. Figure 9 illustrates certain friction members and a dog produced on line 9—9 of Figure 1. Figure 10 is a longitudinal section of a clutch of my invention more particularly applicable to "free wheeling" though involving the parts shown in Figure 1. Figure 11 shows in perspective part of the clutch body of Figure 10. Figure 12 is an elevation of the same as seen from the opposite direction, or as it appears in the position shown in Figure 10, and Figure 13 is an end elevation of the clutch as it would appear in viewing Figure 10 from the left.

The form of my clutch shown in Figures 1, 2 and 3 is adapted for general application, i. e., to any mechanism to be controlled by an overrunning clutch, while the type illustrated in Figures 10, 11, 12 is adaptable to automobile "free wheeling" though both involve the same inventive idea, and both involve the idea of a dog to be moved to a cramped position for clutching purposes as appears in my pending patent application Serial No. 492,118 filed in the United States Patent Office October 30, 1930.

In the first three figures of the drawings 1 designates a shaft as the mounting for two clutch portions 2 and 3 which may abut, one of them, the portion 2, for example, being fixed on the shaft by means of a key 4, or other device, while the other portion is free to rotate about said shaft. The portion 2 includes a peripheral flange 5 in this instance, which may be an integral part or it may be affixed to said portion. Lying at one side of the flange to abut it is a ring 6 and at the other side is a similar ring 7 each of which rings is free to turn with respect to the flange and the said portion 2. The portion 3 terminates adjacent the portion 2, in this instance, in a flange $7^2$ of larger diameter than said flange 5, and, as shown in Figure 7 particularly, it is channeled at spaced intervals, as 8.

Each channel receives a dog consisting of a body 9 having a notch 10 in one edge to receive the flange 5 and the mentioned rings 6, 7 as shown in Figure 1, or to receive said flange and but one of the rings as shown in Figure 6a, said dogs being retained in the channels 8 by means of a shell 11, for example, that member being forced over the flange $7^2$ and retained by friction, the dogs being free to swing within the shell within limits provided by the walls of the said channels 8. As shown in Figure 6 that portion of one of the ends of the dogs within the notch 10 may be tapered to create a somewhat pointed nose 10' adapted to engage in a notch 6' of the adjacent surface of the ring 6, and the other end of the dog may be likewise formed, as $10^2$, to engage in a like notch (not shown) in the ring 7. Or, as in Figures 1, 3 and 9 a set screw 9' may extend through one end of the dog into said notch 10 to engage in a depression 7' of the ring 7, see Figure 5.

In assembling the clutch, the rings 6, 7 are placed in abutment with the flange 5 while the dogs 9 are slipped over the rings to embrace them and the flange 5, after which the shell 11 is forced into the position shown. The span of the dog between the noses 10' 10², if of the type shown in Figure 6, may preferably be but slightly less in extent than the combined measurement of the flange and rings so that in placing the dog in position both noses can be slipped into the notches or grooves of the rings, which are radially disposed, and thereby the dogs and rings may be permanently engaged yet permitting the rings to rotate with respect to the flange when the dogs lie parallel to the axis of rotation of the clutch portions. However, when using the form of dog in Figure 9 the screw 9' is adjusted to enter the depression 7', this form, as may be seen, admitting of adjustment where differences in thickness of the flange and rings overall may exist. In the use of either type, however, sufficient play is permitted to allow the dogs to swing angularly a slight distance before the rings are frictionally engaged with the flange, the rings being free at other times as explained.

It is to be observed that the walls of the channels 8 have a special contour, see Figures 7 and 8. One of said walls lies substantially parallel to the axis of rotation for the most part forming an abutment, see 12, and then said wall angles at 13 toward the outer side of the flange thus widening the channel. That part of the wall lying opposite the angled face 13 is also substantially parallel to the axis of rotation, as 14, the balance of the wall angling away as 15 to widen the channel at the other side of the flange. The particular angle of the walls 13, 15 is not important since the purpose is merely that of widening the channel in such manner that the dog may have a lateral angular swing to allow it to cramp the rings 6, 7. The width of the channel is such, between the faces 12, 14 that the dog may freely lie therein when its plane parallels the said axis of rotation and since it is required that the angular movement be permitted, the channel is widened at opposite spaced positions to admit of such movement.

A light spring may be used to urge the dog toward the angled wall 15, the same being indicated at 16, one extremity thereof being retained in a slot 17 created in the flange 7² near each channel.

In Figure 6a but one ring may abut the flange 5, the structure being otherwise the same as in Figures 1 to 8, but in this instance the dog 9 abuts the flange 5, instead of a ring 7 as in Figures 1 and 9, one nose lying in a notch or groove 6² of the ring 6 while its other nose is rounded as 9² to engage said flange 5.

Let it be supposed that the clutch portion 2 is rotating in a contra-clockwise direction, Figures 2 and 3. The slight friction set up between the ring 6 and the flange 5, Figure 6a, or between the rings 6 and 7 and the flange 5, Figure 9, will carry the dogs to an angular position with respect to the axis of rotation, aided by the flange 7² of the clutch part 3, to cramp the noses of the said dogs and cause the grabbing of the flange and ring surfaces upon each other thus carrying the clutch portion 3 into rotation. This action is instantaneous, however, there being no slippage whatever.

For the purpose of an overrunning clutch, should the rate of rotation of the driving portion 2 fall below that of the driven portion 3, the latter at an attained rate of rotation will advance the ends of the dogs engaging its flange 7² so that said dogs will be aligned with the axis of rotation, releasing the ring or rings, terminating the driving connection of the clutch parts, the dogs abutting the wall surfaces 12, 14. In using the springs 16 a slight pressure of the dogs is maintained in the direction of their travel or in their direction of initial movement to cramp upon the rings and flange.

As already intimated, in the form of mechanism shown in Figure 10, and following figures, the same general arrangement is used in so far as the application of the gripping action is concerned, the illustrated form being of a type well suited to the requirements in automobile practice where "free wheeling" is used.

A splined shaft is denoted at 18, there being mounted thereon at spaced positions, and free to rotate with respect to said shaft, certain gear members 19 and 20 constituting parts of an automobile gearing but of themselves without invention herein, being shown to assist in an understanding of the relation of the clutch portions thereto. Mounted on said shaft between the named members 19, 20 is a clutch portion including a sleeve or hub 21 and a terminal flange 22. As in the first described form the flange is channeled at spaced intervals, as 23, to receive the dogs 24 as before. Enclosing the structure thus provided is a shell 25 including a flange 26 extending from the wall of its bore inwardly to near the sleeve or hub 21, a ring 27 ad a ring 28 one at each side of the flange 26 being employed to grip said flange 26, said ring 28 having notches or grooves 28' corresponding to 6' of Figure 4, and the dogs having substantially the same relation thereto as in said Figure 4. Within the bore of the shell 25 at one end is a series of teeth 29 adapted to mesh with teeth 19' and 20', respectively, of the members 19, 20 when the clutch is shifted along the shaft. Also carried by the ends of the sleeve or hub 21 are clutch teeth 21' to engage teeth 19², 20², respectively, of said members 19, 20, there being any usual groove 30, for example, in the periphery of the shell 25 to receive a shifting lever, not shown.

In assembling this type of clutch the rings 27, 28, or a single one as in Figure 6ª, may be placed in position within the shell 25 to engage the flange 26, followed by the dogs 24 whereupon said shell is slipped over the hub 21 while at the same time entering the dogs into their channels of the said hub flange 22. In order to secure the clutch portions 21, 25 from endwise shifting relatively in one direction a groove 31 may be created in the inner wall of the shell portion 25 and plates 32 may be seated therein by means of screws 33, for example, the flange 22 abutting said plates. As before, the ends of screws 24' carried by the dogs 24 may seat in depressions 24² of one of the rings. It may be seen in Figures 11 and 12 that the channels 23 are created in both the flange 22 and the sleeve or hub 21 and in purpose answer as in the earlier figures, a considerable extent of one wall 34 paralleling the axis of rotation as well as does a shorter surface of the opposite wall 35, while wall portions 36 and 37 lie at an angle to such axis. A recess 38 in the sleeve or hub opens into the channel for the reception of a spring 39 to serve in the same capacity as the described springs 16.

Although in the second described type of clutch the dogs 24 have a reversed position from that of the dogs 9 of the type first described they may have the position of the latter by proper adaptation of the associated parts. In the rotation of the hub 21 clockwise as viewed in Figure 3 the resultant action in the advance of the flange 22, which is a downward direction in viewing Figure 12, the ends of the dogs carried by said flange will move therewith thus shifting them toward the walls 37 of the channels 23, Figure 12. The distance between the point of the screw 24' which bears upon the ring 27, and the noses of said dogs at the rings 28 is thus shortened as measured in a line paralleling the axis of rotation, and thereby the rings 27, 28 are moved toward each other and frictionally engage the flange 26 of the shell 25. In this manner the entire structure is carried into rotation. Now, by shifting the shell 25 along the shaft by any suitable shifting-fork, for example, not shown, the teeth 29 at the end of the shell 25 may be engaged either with the teeth 19' or 20' as the case may be, depending upon the result sought. If it be supposed that the teeth 29 are engaged with the teeth 20', for example, the device is functioning as in "free wheeling" since the hub 21 and the shell 25 will be free to rotate relatively in one direction but not in the other. When the device is to operate as in conventional driving the hub is shifted still further into the teeth 20' whereupon the teeth 21' of the hub 21 will be meshed with the teeth 20² and since both sets of teeth are now in engagement the hub 21 and shell 25 will be fixed relatively, the whole answering the purpose of the common type of clutch.

In either of the forms of clutch illustrated since all of the dogs engage in the grooves of the opposite rings, or as in Figure 6a in the flange 5 and a ring 6, said dogs will be moved as a unit and will all clamp at the same instant.

Attention is drawn to the position of the dogs 9 and 24. It is noted that they lie substantially parallel to the axis of rotation instead of radially as in many older types of clutches. Since they are thus disposed centrifugal force cannot act to swing one extremity ahead of the other as may happen in said older types where one extremity is further from the axis of rotation than the other and where, therefore, undesired action may result. In the present instance centrifugal force will act upon all parts of the dogs equally or to the same degree throughout their lengths.

I claim:

1. A clutch of two parts one of which includes a portion having an exposed surface, a ring adjacent the portion to abut such surface and normally free to rotate with respect to said portion, and a dog mounted at one end in the other part and substantially paralleling the axis of clutch rotation, said dog being free to have lateral movement at its other end in the direction of such rotation, and having spaced opposed faces at said other end embracing between them the said ring and portion.

2. A clutch of two parts one of which includes a portion having exposed opposite surfaces, a ring at each side of the portion to abut the same and normally free to rotate with respect thereto, and a dog mounted at one of its ends in the other part while free to swing therein at its other end in the direction of rotation, the same being fashioned to embrace the rings and said portion, a line extending through the points embraced by the dog substantially paralleling the axis of rotation.

3. In a clutch, a pair of clutch members one having a part provided with opposite exposed friction surfaces, a ring overlying one of the surfaces, and a dog mounted in the other clutch member, the same embracing at its ends the said ring and part, a line paralleling the dog and extending through both said ends thereof substantially paralleling the axis of clutch rotation.

4. The invention according to claim 3 including means carried at one end of the dog adjustable to vary the distance between said ends where they embrace the named parts.

5. In a clutch, a pair of clutch members one having a part provided with opposite exposed friction surfaces, a ring overlying each surface, and a dog mounted in the other clutch member, the same having opposed faces to embrace between them the rings and said part, one of said ends adapted to engage one of the rings, and a screw mounted in the other end of the dog adapted to engage the other ring and adjustable in the direction of the same.

6. A clutch structure including in combination with a shaft, a clutch portion mounted on the shaft to rotate therewith, a second clutch portion normally free to rotate with respect to the first and with respect to said shaft, a pair of rings independent of both said portions, one of the portions including a part interposed between the rings, and a dog carried by the other portion provided with two spaced extensions embracing between them the rings for moving both into frictional engagement with the part in an angular lateral swing of the dog, a line extending through both extensions lying substantially parallel to the axis of rotation.

7. A two part clutch, one part including a portion having two opposite exposed surfaces, a ring adapted to abut one of the surfaces and free to have rotative movement with respect to it, and a plurality of dogs mounted at one of their ends in the other clutch part and free to have lateral movement, their other ends having extensions embracing and lying at opposite sides of the ring and portion.

8. A pair of clutch portions normally independent of each other, one of the portions having an extension providing opposite exposed friction surfaces, a ring abutting one of the surfaces, the other clutch portion having dog-retaining channels therein, and dogs seated in the channels adapted for lateral angular movement therein at one of their ends, and at their other ends embracing the extension and the ring.

9. A pair of separately rotatable clutch portions, one having a fixed flange providing opposite friction surfaces, a ring adapted to abut one of the surfaces, and a plurality of dogs mounted in the other portion and having facing extensions to lie at opposite sides of the combined flange and ring, said dogs being free to swing in a lateral angular direction in the portion carrying them.

10. A two part clutch, one part including a flange having an exposed surface at each of two opposite sides, a freely mounted ring at each side of the flange adapted to abut the same, a plurality of dogs mounted at one of their ends in the other clutch part, said dogs overlying the rings and flange at their other ends and engageable with both rings, and said dogs adapted for a lateral movement in the direction of rotation.

11. A two part clutch, one portion thereof including two opposite exposed surfaces on a part thereof, a freely mounted ring at each side of the portion to abut the said surfaces, and a plurality of dogs each having spaced portions facing each other engageable each with one of the rings, said dogs being mounted in the other clutch portion adapted in the rotative movement of the clutch portions relatively to swing to an angular position to cramp the rings between said spaced portions.

12. A clutch including on one of its portions a flange having two opposite exposed surfaces, a ring adjacent one side of the flange adapted to abut the adjacent surface thereof, said ring having a series of depressions in its exposed surface spaced around the same, a plurality of dogs mounted in the other clutch portion at one of their ends, their other ends embracing the flange and ring, a part of each engaging in one of the depressions of said ring.

13. A clutch including on one of its portions a flange having two opposite exposed surfaces, a ring freely mounted on the portion at one side of the flange adapted to abut the same, said ring having depressions spaced around its exposed side, a plurality of dogs mounted at one of their ends in the other clutch part and substantially paralleling the axis of rotation, said clutch part arranged to permit lateral angular movement of said dogs in one direction of rotative movement of the clutch, the other ends of the dogs embracing the flange and ring, a part of each engaging in a depression of said ring.

14. A clutch including on one of its portions an annular flange exposing two opposite surfaces, a freely mounted ring encircling the portion at each side of the flange adapted each to abut one surface of the same and each ring having a series of spaced depressions around its outer side, a plurality of dogs mounted at one of their ends in the other clutch portion, such portion having provision for permitting the dogs to have lateral angular movement in one direction, the other ends of the dogs embracing the flange and said rings, parts of each engaging in depressions of opposite rings.

15. A clutch including on one of its portions an annular flange exposing two opposite surfaces, a freely mounted ring at each side of the flange, and dogs mounted free of said portion having facing fixed extensions adapted to embrace the flange and rings and each engaging a ring adapted when the dog is swung angularly in the direction of clutch rotation to engage the rings with said flange.

16. A shaft, a clutch-part mounted upon and adapted to rotate with the same and free to have movement therealong, a second clutch part rotatably mounted upon the first named part including an internal flange having opposite exposed surfaces, a ring encircling the said first named part adjacent the flange, and a series of dogs mounted between the two parts of the clutch and having extensions embracing the ring and flange adapted in an angular movement to engage the ring with said flange.

17. A shaft, a clutch part mounted upon and rotatable with the same and free to have movement therealong, a second clutch part rotatably mounted upon the first named part including an internal flange having opposite exposed surfaces, a ring encircling the said first named part at each side of the flange to abut the same, and a series of dogs mounted between the two clutch parts having extensions embracing the flange and rings, engaging both the latter, adapted in a lateral angular movement to engage the rings with said flange.

18. A shaft, a clutch part mounted upon and adapted to rotate with the same while free to have movement therealong including clutch teeth at one of its ends, a second clutch part rotatable about the first named part including clutch teeth at one end, and also including an internal annular flange having opposite exposed surfaces, a ring encircling the said first named part at each side of the flange, a series of dogs, there being provision in the first named part to receive the dogs, spacing the same around the part, said dogs having spaced extensions adapted to embrace the flange and rings and engaging both the latter, said dogs adapted in a rotary movement of one of the named clutch parts relative to the other to partake of a lateral angular movement for frictionally engaging said rings with said flange, and a member having two series of clutch teeth, each series being in position to receive the named clutch teeth of the two clutch parts.

19. A clutch including in its construction a clutch member having a channel, a dog lying in the channel, portions of the walls of said channel at one extreme thereof being spaced apart a distance but slightly in excess of the thickness of the dog, the latter lying at one end therein and permitted a limited lateral movement, one wall of the channel being inclined at an angle to the axis of rotation of the clutch in the direction of such rotation to permit the dog to swing widely in a lateral direction at its other end.

20. The invention according to claim 19 including a mounted spring abutting the dog and adapted to urge it toward the named inclined wall.

21. The invention according to claim 19 including that the swinging end of the dog extends from the channel outward from the clutch member and normally substantially paralleling the axis of clutch rotation.

22. A clutch including in its construction two main parts, one of them including a portion having a surface to rotate in a plane at right angles to the axis of rotation, a ring adjacent said surface adapted to abut the same and normally free to rotate with respect to the said portion, a dog mounted at one of its ends in the other clutch part and free to rock laterally in the direction of rotation, the last named clutch part having an abutment at one side of the dog at its mounted end, its surface substantially paralleling the axis of rotation, said dog being free to have lateral movement at its other end in the direction of rotation and having opposed faces to embrace between them the said ring and portion, a line extending through both the ring and portion and through both said faces substantially paralleling the axis of rotation.

ERNEST STARBUCK.